US012796652B2

(12) United States Patent
Yoshinaga

(10) Patent No.: US 12,796,652 B2
(45) Date of Patent: Nov. 17, 2026

(54) EXCREMENT TREATMENT MATERIAL AND METHOD FOR MANUFACTURING THE SAME

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 19/013,129

(22) Filed: Jan. 8, 2025

(65) Prior Publication Data

US 2025/0143252 A1 May 8, 2025

Related U.S. Application Data

(63) Continuation of application No. PCT/JP2023/029587, filed on Aug. 16, 2023.

(30) Foreign Application Priority Data

Sep. 13, 2022 (JP) ................................. 2022-144958

(51) Int. Cl.
*A01K 1/015* (2006.01)

(52) U.S. Cl.
CPC .................................. *A01K 1/0155* (2013.01)

(58) Field of Classification Search
CPC .. A01K 1/0155; A01K 1/0152; A01K 1/0154; A01K 1/015; B01J 20/24; B01J 20/28019; B01J 20/28014; A61L 15/60
See application file for complete search history.

(56) References Cited

U.S. PATENT DOCUMENTS

2004/0007251 A1* 1/2004 Koenig .................. C11D 3/382 15/104.93
2012/0128620 A1* 5/2012 Mohr ................... A01K 1/0155 424/76.6
2012/0288955 A1* 11/2012 Ito ........................... A61L 15/60 436/163
2015/0208606 A1 7/2015 Raper et al.
2017/0245460 A1 8/2017 Lipscomb et al.
2018/0303059 A1* 10/2018 Ito ........................ A01K 1/0155

FOREIGN PATENT DOCUMENTS

CN 112005894 A 12/2020
JP H09-187183 A 7/1997
JP 2015-97996 A 5/2015
JP 6178417 B2 8/2017
WO WO-2016081953 A1 * 5/2016 ............ B01J 20/165

OTHER PUBLICATIONS

Oct. 17, 2023 International Search Report issued in International Patent Application No. PCT/JP2023/029587.
Oct. 17, 2023 Written Opinion issued in International Patent Application No. PCT/JP2023/029587.
May 1, 20, 2026 Office Action issued in Chinese Patent Application No. 2026052001742530.

* cited by examiner

*Primary Examiner* — Magdalena Topolski
*Assistant Examiner* — Spencer T Callaway
(74) *Attorney, Agent, or Firm* — Oliff PLC

(57) ABSTRACT

An excrement treatment material absorbs cat urine. The excrement treatment material includes a grain that has a water absorbing property. The grain contains an inhibitor that inhibits a protein in cat urine.

14 Claims, 2 Drawing Sheets

EXCREMENT TREATMENT MATERIAL AND METHOD FOR MANUFACTURING THE SAME

CROSS REFERENCE TO RELATED APPLICATION

This is a Continuation of International Application No. PCT/JP2023/029587 filed Aug. 16, 2023, which claims the benefit of Japanese Application No. 2022-144958 filed Sep. 13, 2022. The contents of these applications are hereby incorporated by reference in their entirety.

TECHNICAL FIELD

The present invention relates to an excrement treatment material for cats and a method for manufacturing the same.

BACKGROUND ART

A conventional excrement treatment material is disclosed, for example, in Patent Document 1. The excrement treatment material disclosed in Patent Document 1 is an excrement treatment material for cats, and composed of a plurality of grains that have a water absorbing property. This excrement treatment material is used in a state in which the plurality of grains are laid in a box-shaped toilet.

CITATION LIST

Patent Document

Patent Document 1: JP 2015-97996 A

SUMMARY OF INVENTION

Technical Problem

The excrement treatment material described above treats cat urine excreted in the toilet by having the grains absorb the urine. However, a malodor that is generated from the urine absorbed by the grains sometimes drifts around the excrement treatment material. The malodor is said to be caused by a compound called felinine that is produced in cat urine. The production of felinine is catalyzed by a protein (cauxin) contained in cat urine.

Solution to Problem

The present invention has been made in view of the above-described problem, and it is an object thereof to provide an excrement treatment material that can reduce a malodor generated from cat urine, and a method for manufacturing the same.

An excrement treatment material according to the present invention is an excrement treatment material that absorbs cat urine including: a grain that has a water absorbing property, wherein the grain contains an inhibitor that inhibits a protein in the urine.

In this excrement treatment material, the grain is provided that contains an inhibitor that inhibits a protein in cat urine. Thus, catalysis of the protein in urine absorbed by the grain is hindered. For this reason, it is possible to restrain production of felinine that causes a malodor.

A method for manufacturing an excrement treatment material according to the present invention is a method for manufacturing an excrement treatment material that absorbs cat urine, the method including: a grain forming step of forming a grain that has a water absorbing property, wherein in the grain forming step, the grain is formed that contains an inhibitor that inhibits a protein in the urine.

In this manufacturing method, the grain is formed that contains an inhibitor that inhibits a protein in cat urine. Thus, catalysis of the protein in urine absorbed by the grain is hindered in the manufactured excrement treatment material. For this reason, it is possible to restrain production of felinine that causes a malodor.

Advantageous Effects of Invention

According to the present invention, it is possible to implement an excrement treatment material that can reduce a malodor generated from cat urine, and a method for manufacturing the same.

DESCRIPTION OF EMBODIMENTS

Figure 1:
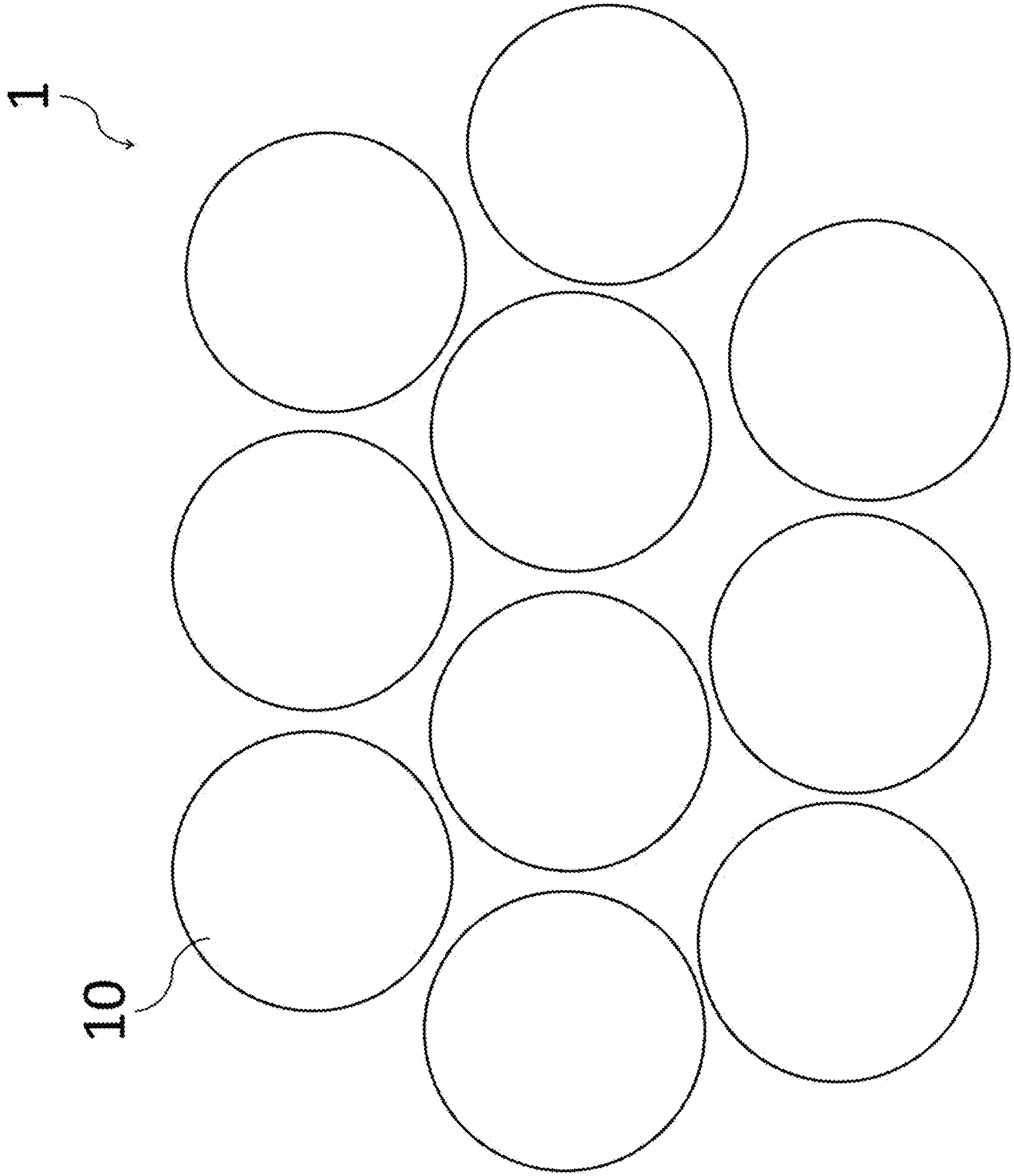
FIG. 1 is a schematic view showing an embodiment of an excrement treatment material according to the present invention.

Hereinafter, an embodiment of the present invention will be described in detail with reference to the drawings. In the description of the drawings, the same elements are given the same reference numerals, and a redundant description will be omitted.

FIG. 1 is a schematic view showing an embodiment of an excrement treatment material according to the present invention. An excrement treatment material 1 is an excrement treatment material for cats that absorbs cat urine. The excrement treatment material 1 includes a plurality of grains 10. The excrement treatment material 1 is used, for example, in a state in which the plurality of grains 10 are laid in a box-shaped toilet.

Each grain 10 has a water absorbing property. That is, each grain 10 takes urine in the inside thereof and retains it. The grains 10 having the water absorbing property require a liquid passing rate of less than 60% measured by the following test. First, approximate 50 grams of the grains 10 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the measured water quantity with respect to the quantity of the dripped water (30 ml) shall be the liquid passing rate. That is, if the water quantity in the beaker is less than 18 ml, the liquid passing rate is less than 60%, and therefore the grains 10 are found to have the water absorbing property.

Each grain 10 has a granular shape. Examples of the granular shape include a sphere, column, and ellipsoid. The particle diameter of each grain 10 is, for example, between 5 mm and 20 mm inclusive. As used herein, the particle diameter of the grain 10 is defined as the diameter of the minimum sphere that can include the grain 10.

Each grain 10 contains an inhibitor that inhibits a protein (cauxin) in cat urine. The inhibitor has a property of hindering catalysis of the protein. Note that "inhibit" in the present specification includes not only a case where the inhibitor hinders catalysis of a protein by binding to the protein, but also a case where the inhibitor hinders catalysis of a protein by decomposing the protein and a case where the inhibitor hinders catalysis of a protein by denaturing the protein. That is, the inhibitor may be a binding-type inhibitor that inhibits a protein by binding to the protein, a decomposing-type inhibitor that inhibits a protein by decomposing the protein, or a denaturing-type inhibitor that inhibits a protein by denaturing the protein.

Examples of the binding-type inhibitor include an inhibitor such as lectin that specifically binds to the above-described protein. Examples of the decomposing-type inhibitor include a digestive enzyme (protease) such as pepsin, trypsin, or peptidase. As the protease, a protease contained in fruit such as pineapple, kiwi fruit, papaya, or apple may be used. Examples of the denaturing-type inhibitor include a modifier such as guanidine hydrochloride. The weight ratio of the inhibitor with respect to each grain 10 is, for example, between 1% and 10% inclusive.

Each grain 10 contains an organic substance other than the inhibitor as its main material. As used herein, the main material of the grain 10 refers to one of the material(s) constituting the grain 10 that accounts for the highest weight ratio in the grain 10. Examples of the organic substance that is the main material of the grain 10 include papers, plants, plastics, and organic sludge. Each grain 10 is preferably made only of an organic substance (including the inhibitor).

The papers refer to a material made mainly of pulp. As the papers, in addition to ordinary paper (paper powder), for example, fluff pulp, paper derived from vinyl chloride wallpaper (paper generated during manufacturing or classifying vinyl chloride wallpaper), paper derived from a gypsum board (paper generated during manufacturing or classifying a gypsum board), or paper derived from a sanitary article (paper generated during manufacturing or classifying a sanitary article that contains paper) can be used. Examples of the sanitary article containing paper include paper diapers, sanitary napkins, urine absorbing pads, and sanitary paper (tissue paper, toilet paper, paper towels, or the like). As the plants, for example, wood powder, sawdust, or a plant residue (used tea leaves, bean curd lees, or the like) can be used. As the plastics, in addition to ordinary plastic, for example, plastic derived from vinyl chloride wallpaper (plastic generated during manufacturing or classifying vinyl chloride wallpaper), or plastic derived from a sanitary article (plastic generated during manufacturing or classifying a sanitary article that contains plastic) can be used. Examples of the sanitary article containing plastic include paper diapers, sanitary napkins, urine absorbing pads, and sanitary masks. As the organic sludge, for example, papermaking sludge, or pulp sludge can be used.

Figure 2:
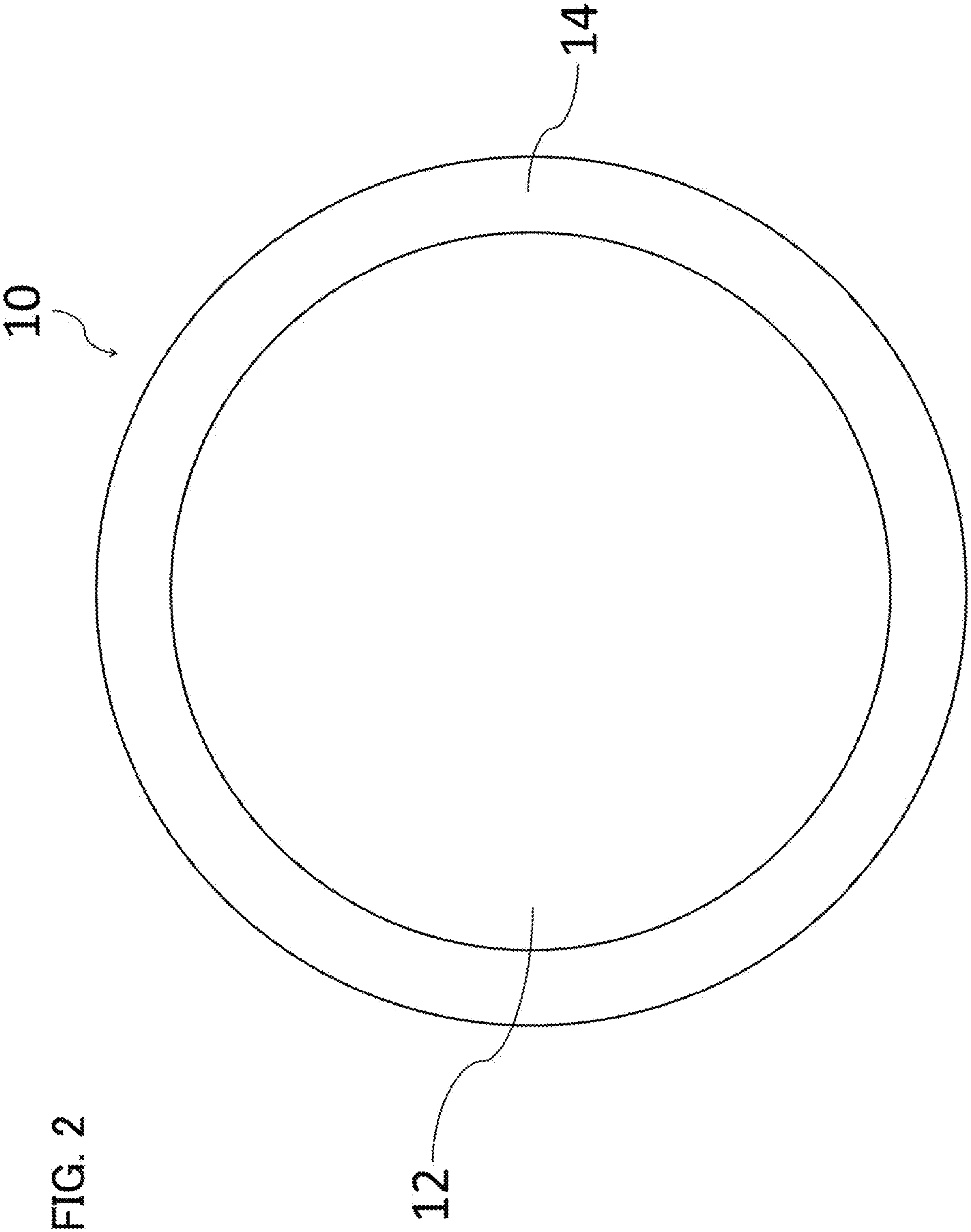
FIG. 2 is a schematic view showing a grain 10.

FIG. 2 is a schematic view showing the grain 10. Each grain 10 includes a core portion 12, and a coating portion 14. The core portion 12 is a granule formed in a granular shape. The core portion 12 has a function of absorbing and retaining urine. The core portion 12 contains an organic substance other than the inhibitor as its main material. As used herein, the main material of the core portion 12 refers to one of the material(s) constituting the core portion 12 (core portion material) that accounts for the highest weight ratio in the core portion 12. The core portion 12 may or may not contain an adhesive material. Examples of the adhesive material include a water-absorbent polymer, starch, CMC (carboxymethyl cellulose), PVA (polyvinyl alcohol), and dextrin. As the water-absorbent polymer, for example, an acrylic water-absorbent polymer such as sodium polyacrylate can be used.

The coating portion 14 covers the core portion 12. The coating portion 14 may cover the entire surface of each core portion 12, or may cover only a part of the surface of each core portion 12. The coating portion 14 has a function (agglomeration forming function) of bonding the grains 10 that have absorbed urine to agglomerate them when in use. The coating portion 14 contains an adhesive material. The coating portion 14 also contains an organic substance other than the inhibitor as its main material. As used herein, the main material of the coating portion 14 refers to one of the material(s) constituting the coating portion 14 (coating material) that accounts for the highest weight ratio in the coating portion 14. In the present embodiment, the inhibitor is contained in both the core portion 12 and the coating portion 14.

Next, an example of a method for manufacturing the excrement treatment material 1 will be described as an embodiment of a method for manufacturing an excrement treatment material according to the present invention. This manufacturing method includes a grain forming step.

The grain forming step is a step of forming the grain 10. The grain forming step includes a core portion forming step, and a coating portion forming step. The core portion forming step is a step of forming the core portion 12. In the core portion forming step, a plurality of granules that will serve as the core portions 12 are formed by granulating the core portion material containing the inhibitor with a granulation apparatus. As the granulation apparatus, for example, an extrusion granulator can be used. Prior to the granulation, pretreatment such as pulverization, kneading, and adding water is performed on the core portion material as needed.

The coating portion forming step is a step of forming the coating portion 14. In the coating portion forming step, the coating portion 14 is formed by attaching the coating material containing the inhibitor to the surface of each core portion 12 with a coating apparatus or the like. The coating material can be attached by, for example, sprinkling or spraying. After that, posttreatment such as sieving (sizing), and drying is performed as needed. Accordingly, the excrement treatment material 1 composed of the plurality of grains 10 is obtained.

The effects of the present embodiment will be described. In the present embodiment, the grain 10 is formed that contains an inhibitor that inhibits a protein in cat urine. Thus, catalysis of the protein in urine absorbed by the grain 10 is hindered in the excrement treatment material 1. For this reason, it is possible to restrain production of felinine that causes a malodor. Accordingly, the excrement treatment material 1 that can reduce a malodor generated from cat urine, and the method for manufacturing the same are implemented.

Particularly in the case where the inhibitor is a binding-type, the inhibitor exhibits the inhibitory effect simply by binding to a specific site of a protein, and therefore there is an advantage that catalysis of the protein can be hindered quickly.

The grain 10 includes the core portion 12 and the coating portion 14. In this case, different functions can be assigned to the core portion 12 and the coating portion 14. For example, in the present embodiment, the water absorption and retention function is assigned mainly to the core portion 12, and the agglomeration forming function is assigned to the coating portion 14.

The inhibitor is contained in both the core portion 12 and the coating portion 14. Thus, it is possible to effectively reduce malodors generated from both urine remaining in the core portion 12 and urine remaining in the coating portion 14.

The grain 10 contains an organic substance as its main material. Thus, it is possible to obtain the grain 10 suitable for being disposed of by incineration. This contributes to convenience of disposal of the grain 10 after use. Particularly in the case where each grain 10 is made only of an organic substance, it is possible to obtain the grain 10 more suitable for being disposed of by incineration.

The present invention is not limited to the above-described embodiment, and various modifications can be made. In the above-described embodiment, an example is given in which the inhibitor is contained directly in the grain 10. However, the inhibitor may be contained in the grain 10 in a state of being carried in a carrier. In that case, the entirety of the inhibitor may be carried in the carrier, or only a part of the inhibitor may be carried in the carrier with the remaining part of the inhibitor contained directly in the grain 10.

Examples of the carrier include a water-absorbent polymer. That is, the grain 10 may contain a water-absorbent polymer in which the inhibitor is carried. In that case, in the core portion forming step, a step of preparing the core portion material by mixing a water-absorbent polymer in which the inhibitor is carried in advance with another material is performed prior to the granulation. Moreover, in the coating portion forming step, a step of preparing the coating material by mixing a water-absorbent polymer in which the inhibitor is carried in advance with another material is performed prior to attaching the coating material to the surface of the core portion 12. Because a relatively large amount of urine collects in a water-absorbent polymer, a malodor generated from urine can be efficiently reduced due to the inhibitor being carried in the water-absorbent polymer.

In the above-described embodiment, an example is given in which the inhibitor is contained in both the core portion 12 and the coating portion 14. However, the inhibitor may be contained in only either one of the core portion 12 or the coating portion 14. In that case, it is possible to save the amount of the inhibitor used, and thereby reduce the manufacturing cost of the excrement treatment material 1.

In the case where the inhibitor is contained only in the core portion 12, out of the core portion 12 and the coating portion 14, it is advantageous for preventing the inhibitor from falling off from the grain 10 before use. On the other hand, in the case where the inhibitor is contained only in the coating portion 14, out of the core portion 12 and the coating portion 14, the inhibitor reduces mainly a malodor generated from urine remaining in the coating portion 14. The malodor generated from urine remaining in the coating portion 14 is more likely to leak outside the excrement treatment material 1 than a malodor generated from urine remaining in the core portion 12. Therefore, it is possible to efficiently restrain a malodor from drifting around the excrement treatment material 1 with a small amount of the inhibitor by reducing mainly the malodor generated from urine remaining in the coating portion 14.

In the above-described embodiment, an example is given in which each grain 10 has multi-layer structure (double-layer structure) composed of the core portion 12 and the coating portion 14. However, it is not essential to provide the coating portion 14. That is, each grain 10 may have single-layer structure composed only of an uncovered granule (the core portion 12). In that case, since the coating material is not required, the manufacturing cost of the excrement treatment material 1 can be reduced.

LIST OF REFERENCE NUMERALS

1 Excrement Treatment Material
10 Grain
12 Core Portion
14 Coating Portion

The invention claimed is:

1. An excrement treatment material that absorbs cat urine comprising:
- a grain that has a water absorbing property,
- wherein the grain contains a lectin that binds to cauxin so as to inhibit cauxin in the urine.

2. The excrement treatment material according to claim 1, wherein the grain contains a water-absorbent polymer in which the lectin is carried.

3. The excrement treatment material according to claim 1, wherein the grain includes a granular core portion, and a coating portion that covers the granular core portion.

4. The excrement treatment material according to claim 3, wherein the lectin is contained only in the granular core portion, out of the granular core portion and the coating portion.

5. The excrement treatment material according to claim 3, wherein the lectin is contained only in the coating portion, out of the granular core portion and the coating portion.

6. The excrement treatment material according to claim 3, wherein the lectin is contained in both the granular core portion and the coating portion.

7. The excrement treatment material according to claim 1, wherein the grain contains an organic substance as a main material.

8. The excrement treatment material according to claim 7, wherein the grain is made only of an organic substance.

9. A method for manufacturing an excrement treatment material that absorbs cat urine, the method comprising:
- a grain forming step of forming a grain that has a water absorbing property,
- wherein the grain contains a lectin that binds to cauxin so as to inhibit cauxin in the urine.

10. The method for manufacturing an excrement treatment material according to claim 9, wherein in the grain forming step, the grain is formed that contains a water-absorbent polymer in which the lectin is carried.

11. The method for manufacturing an excrement treatment material according to claim 9, wherein the grain forming step includes a core portion forming step of forming a granular core portion, and a coating portion forming step of forming a coating portion that covers the core portion.

12. The method for manufacturing an excrement treatment material according to claim 11, wherein
- in the core portion forming step, the core portion that contains the lectin is formed, and
- in the coating portion forming step, the coating portion that does not contain the lectin is formed.

13. The method for manufacturing an excrement treatment material according to claim 11, wherein
- in the core portion forming step, the core portion that does not contain the lectin is formed, and
- in the coating portion forming step, the coating portion that contains the lectin is formed.

14. The method for manufacturing an excrement treatment material according to claim 11, wherein in the core portion forming step, the core portion that contains the lectin is formed, and in the coating portion forming step, the coating portion that contains the lectin is formed.

* * * * *